United States Patent [19]
Yoshino

[11] Patent Number: 5,499,269
[45] Date of Patent: Mar. 12, 1996

[54] TRANSMISSION-RECEPTION CIRCUIT

[75] Inventor: Ryozo Yoshino, Hadano, Japan

[73] Assignee: Hitachi, Ltd., Tokyo, Japan

[21] Appl. No.: 275,393

[22] Filed: Jul. 15, 1994

[30] Foreign Application Priority Data

Jul. 20, 1993 [JP] Japan ..................... 5-179127

[51] Int. Cl.$^6$ .................................. H04B 1/00
[52] U.S. Cl. ................ 375/257; 375/219; 375/287; 375/318; 370/32
[58] Field of Search ..................... 375/219, 257, 375/287, 288, 317, 318; 370/377, 27, 32; 455/38.3

[56] References Cited

U.S. PATENT DOCUMENTS

| | | | |
|---|---|---|---|
| 4,437,021 | 3/1984 | Sumi et al. | 375/257 |
| 4,573,168 | 2/1986 | Henze et al. | 375/257 |
| 4,605,864 | 8/1986 | Yaradaragan et al. | 375/257 |
| 4,860,309 | 8/1989 | Costello | 375/286 |
| 4,899,332 | 2/1990 | Crutcher et al. | 370/32 |
| 5,355,390 | 10/1994 | Yamamoto et al. | 375/257 |

FOREIGN PATENT DOCUMENTS

| | | |
|---|---|---|
| 51-64811 | 6/1976 | Japan . |
| 56-98052 | 8/1981 | Japan . |
| 2-50537 | 2/1990 | Japan . |
| 3-186033 | 8/1991 | Japan . |

*Primary Examiner*—Young T. Tse
*Attorney, Agent, or Firm*—Antonelli, Terry, Stout & Kraus

[57] ABSTRACT

A transmission-reception circuit, including a transmitter circuit and a receiver circuit connected to each end of a transmission line, for transmitting and receiving a signal to another receiver circuit and from another transmitter circuit at the other end across the transmission line, wherein in order to enable logical decision on a receiving signal to be made accurately and secure high reliability in a fully duplex simultaneous two-way communication, power supply lines are laid at opposite ends of the transmission line and threshold voltages for logical decision on a signal received by the receiver circuit are supplied from a power unit used for the transmitter circuit and the receiver circuit at the other end of the transmission line.

7 Claims, 8 Drawing Sheets

F I G. 2
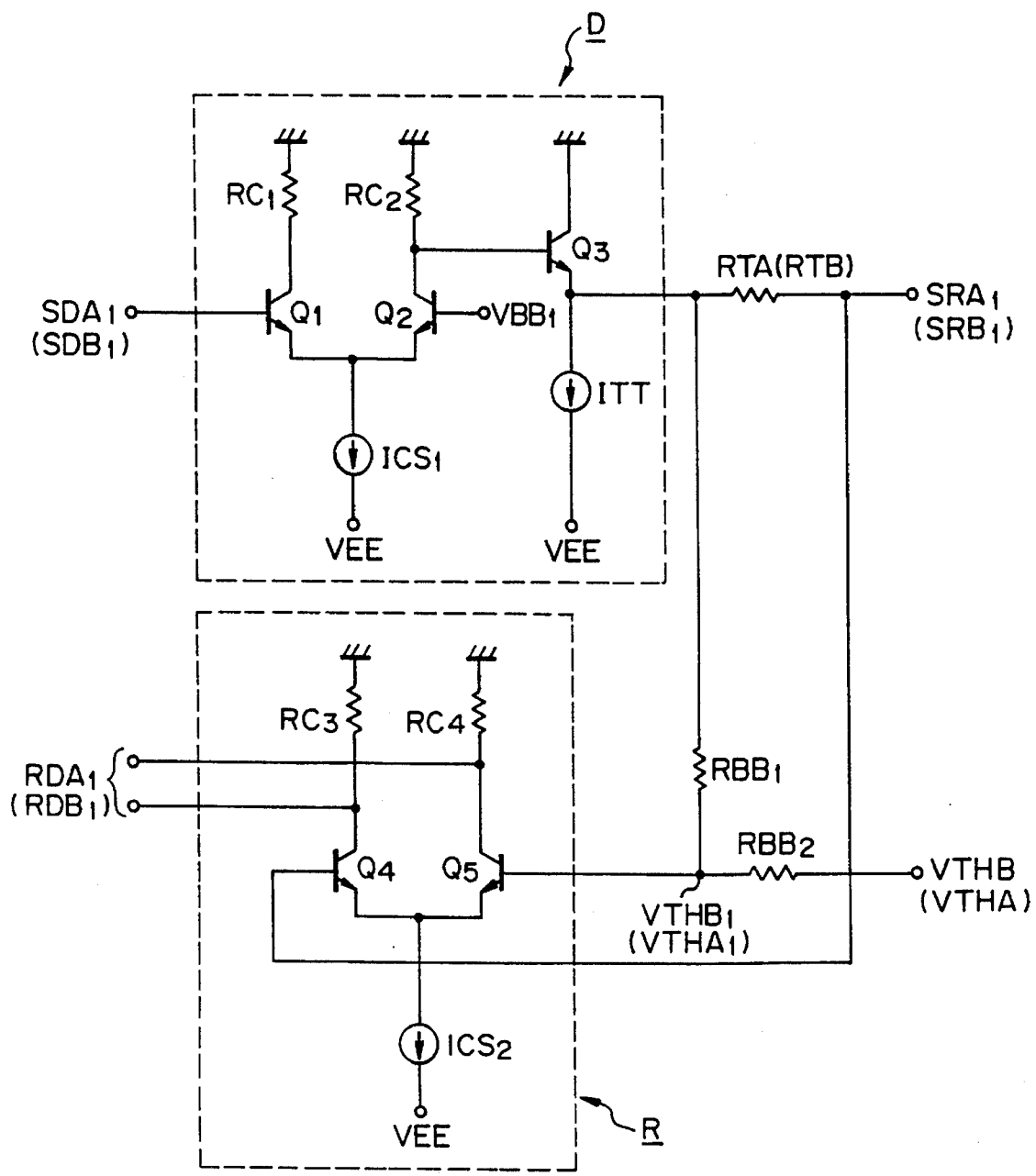

| SD₁ | 0 | 1 | 1 | 1 | 1 | 0 | 0 | 0 |
|---|---|---|---|---|---|---|---|---|
| R₁₁ OUTPUT | 0 | 0 | 1 | 1 | 1 | 0 | 0 | 0 |
| R₁₂ OUTPUT | 0 | 1 | 1 | 1 | 1 | 1 | 1 | 0 |
| RD₁ | 0 | 0 | 1 | 1 | 1 | 1 | 1 | 0 |

TRANSMISSION-RECEPTION CIRCUIT

BACKGROUND OF THE INVENTION

This invention relates to a transmission-reception circuit including a transmitter circuit and a receiver circuit connected to each end of a transmission line, or to a transmitter-receiver circuit connected to a bus-structure type common transmission line.

As the transmission-reception circuit for transferring digital signals between two devices connected to opposite ends of a transmission line, those disclosed in JP-A-56-98052, JP-A-3-186033, JP-A-2-50537, JP-A-51-64811, and U.S. Pat. No. 4,899,332 are heretofore well known.

The transmission-reception circuit disclosed in JP-A-56-98052 (title of the invention: Baseband Two-Way Simultaneous Transmission Circuit) is capable of fully duplex communication on a transmission line, which was made possible by connecting outputs of the transmitter circuits in the communication devices to the opposite communication devices through resistances and a transmission line, inputting as reference inputs of comparators the voltages obtained by combining the outputs of the transmitter circuits, divided by voltage-divider resistances, with the reference voltages, inputting the received signal from the other device as a comparative input to the comparator, and detecting changes in level of the signal received from the other device with the comparator regardless of the signal from the device at this end.

The transmission-reception circuit disclosed in JP-A-3-186033 (title of invention: Signal Transmission System) is capable of fully duplex communication on a transmission line, made possible by, after combining signals from a set of opposing transmitters by a signal synthesizer, separating the transmitting signal by this device and the transmitting signal by the other device from the composite signal, and extracting the transmitting signal sent by the other device by removing only this device's own transmitting signal from the signals separated as described.

The transmission-reception circuit disclosed in JP-A-2-50537 (title of invention: Two-Way Simultaneous Communication System) is capable of fully duplex communication on a transmission line, made possible by having the devices at opposite ends of a communication line provided with a driver circuit and a receiver circuit formed based on the same reference, generating threshold values and desired output voltages corresponding to high-level or low-level input signals by setting supply voltages and resistances, and discriminating the signal level of the other device by comparing the output voltages with the corresponding threshold values with the comparators of the receiver circuits at the opposite ends.

The transmission-reception circuit disclosed in JP-A-51-64811 (title of invention: A Fully Duplex Digital Transmission Method And Device Using A Single Signal Line) is capable of fully duplex communication on a transmission line by generating a composite signal by comparing a transmitting signal and a receiving signal, and regenerating a receiving signal from the composite signal.

FIG. 13 is a block diagram of a transmission system formed by using the invention of JP-A-51-64811, and shows a plurality of transmitter-receiver circuits TR1, TR2, and TRn connected to a transmission line L, both ends of the line L being connected to earth through terminal resistances RT. The transmitter-receiver circuits TR are formed respectively by drivers D1, D2, Dn and receivers R1, R2, Rn, and send transmitting signals SD1, SD2, SDn and receive receiving signals RD1, RD2, RDn. In FIG. 13, Z0 indicates a line impedance.

The transmission-reception circuit of U.S. Pat. No. 4,899,332 is capable of fully duplex communication on a transmission line, made possible by providing an adder circuit for adding signals sent from two transmitters, comparing output of the adder circuit with a threshold voltage which shifts according to the transmission level of the transmitter on this side, and extracting only the signal sent from the transmitter on the other side.

FIG. 14 is a circuit diagram showing the configuration of the transmission-reception circuit of U.S. Pat. No. 4,899,332, and a set of transmitter-receiver circuits connected to one end of a transmission line L with line impedance Z0 includes a pair of a transmitter circuit DA and a receiver circuit RA, and another set at the other end includes a pair of a transmitter circuit DB and a receiver circuit RB.

Output of the transmitter circuit DA for sending a transmitting signal SDA is connected through a terminal resistance RTA to the transmission line L, and is also connected through voltage-divider resistances ra1 and ra2 to a threshold voltage. A voltage obtained with voltage-divider resistances ra1 and ra2 connected between the output voltage of the transmitter circuit DA and the threshold voltage VTHA is input as a reference voltage to the receiver circuit RA formed by a differential amplifier. A signal at a junction point between the terminal resistance RTA and the transmission line L is input through a resistance ra3 to the other input terminal of the receiver circuit RA.

The transmitter-receiver circuit on the other end of the transmission line L is formed in the same way as described above. In FIG. 14, the components on the other end are shown with subscript codes B or b.

The values of the resistances are set such that RTA=RTB, ra1=ra2, ra3=ra1//ra2, rb1=rb2, and rb3= rb1//rb2.

Therefore, when the transmitter circuit is not sending a signal, the reference voltage input terminal (−) of the receiver circuit RA is at ½ of the threshold voltage VTHA. However, when the transmitter circuit DA sends a transmitting signal, the voltage level of the input terminal (−) shifts to the HIGH level side by the amount corresponding to the amplitude of the transmitting signal. Consequently, even when the transmitter circuit DA in the same circuit sends a signal, the voltage level of the input terminal (+) of the receiver circuit RA does not exceed the voltage level of the reference voltage input terminal (−), so that the receiving signal RDA stays at the LOW level.

However, while the transmitter circuit DA is sending a transmitting signal, if the transmitter circuit DB at the other end sends a transmitting signal, the voltage level of the input terminal (+) of the receiver circuit RA exceeds the voltage level of the reference voltage input terminal (−), and therefore the receiving signal RDA goes to the HIGH level. On the other hand, while the transmitter circuit DA is not sending a transmitting signal, if the transmitter circuit DB on the other end is sending a transmitting signal, in this case, too, the voltage level of the input terminal (+) of the receiver circuit RA exceeds the voltage level of the reference voltage input terminal (−). and therefore the receiving signal RDA switches to the HIGH level.

The arrangements described above makes a fully duplex communication possible.

SUMMARY OF THE INVENTION

In inter-unit communication among the units used in a latest large-sized computer system, in the areas where throughput is regarded as important, the transmit data line and the receive data line are very often provided independently. In such a case, the number of interfaces between the units increases, the units for accommodating the interfaces have to be large in size, and as a result, the distance from the transmitting end to the receiving end is prolonged.

On the other hand, in microprocessors, there is a tendency for 32-bit data to be replaced by 64-bit data, so that the number of wires will inevitably increase. When the number of wires increases, the LSI area for accommodating the wires will expand and, eventually, the distance between the transmitting end and the receiving end will be prolonged as mentioned above.

According to the prior art described above, two-way transmission of data on one signal line is possible, and therefore the transmit data line and the receive data line of the above-mentioned computer system can be combined into a single data line and, as a result, the number of signal lines can be reduced. However, since each threshold voltage for logical decision in the receiver circuit is generated on the basis of the earth potential of an apparatus which accommodates the transmission-receipt circuit, if the distance between the transmitting and receiving ends is prolonged, a potential difference between them increases, the level of receiving signal in the receiver circuit varies, resulting in an inaccurate logical decision on the receiver side, after all, leading to an unreliable data transmission.

In the case where the transmission line is of bus structure, it is not allowed for three transmitter circuits to transmit signals simultaneously. In the above-mentioned prior art, however, this is not taken into consideration, so that there is a problem that when three transmitter circuits send signals simultaneously, an erroneous signal transmitting signal to the receiver side takes place.

An object of the present invention is to provide a highly reliable transmission-reception circuit capable of correctly making a logical decision about a receiving signal even when the distance between the transmitting and receiving ends is prolonged.

A second object of the present invention is to provide a transmission-reception circuit capable of preventing faulty transmission when three transmitter circuit send signals simultaneously on a transmission line of the bus structure.

To achieve the object mentioned above, according to the present invention, there is provided a transmission-reception circuit, including a transmitter circuit and a receiver circuit connected to each end of a transmission line, for transmitting and receiving a signal to the receiver circuit and from the transmitter circuit at the other end of the transmission line, wherein power supply lines are laid at both the opposite ends of the transmission line, and a threshold voltage for logical decision on a signal received by the receiver circuit at one end is supplied from a power unit used for the transmitter circuit and the receiver circuit at the other end.

In order to achieve the second object, in a transmission-reception circuit, including a transmitter circuit and a receiver circuit connected to a bus-structure type transmission line, for transmitting and receiving a signal to another receiver circuit and from another transmitter circuit of another transmitter-receiver circuit through a common transmission line, the receiver circuit comprises a first comparing means for comparing a signal sent out on the common transmission line with first and second threshold voltages for logical decision on the signal, these threshold voltages differing in voltage level by the amount corresponding to the amplitude of the signal sent out on the common transmission line, and a second comparing means for comparing the signal sent out on the common transmission line with a third threshold voltage of a level further higher by the amount corresponding to the amplitude of the signal sent out on the common transmission line than the level of the sum of the first and second threshold voltages, and outputting an alarm signal to invalidate the signal on the common transmission line when a signal higher than the third threshold voltage appears on the common transmission line.

According to the above-mentioned means, the threshold voltages for logical decision on signals received by the receiver circuits at both opposite ends of the transmission line are supplied from the power units used for the transmitter circuit and the receiver circuit at the opposite ends of the transmission line. Therefore, even if the distance between the transmitting and receiving ends is prolonged and the level of signal changes, because the threshold voltages change similarly, the amount of change is canceled out. As a result, a logical decision on a receiving signal can be made accurately, thus ensuring a high reliability in data transmission.

In a transmitter circuit and a receiver circuit connected to a bus-structure type common transmission line, a signal sent out on the common transmission line is compared with a third threshold voltage of a level higher by the amount corresponding to the amplitude of the signal sent out on the common transmission line than the level of the sum of the first and second threshold voltages, and when a signal higher than the third threshold voltage appears on the common transmission line, an alarm signal to invalidate the signal on the common transmission line is output. If the receiving signal is treated as invalid according to the alarm signal, this will prevent faulty transmission when three transmitter circuits send out signals on the bus-structure type common transmission line at the same time.

BRIEF DESCRIPTION OF THE DRAWINGS

FIG. 2 is a detailed configuration diagram showing the first embodiment of the transmission-reception circuit in FIG. 1;

DESCRIPTION OF THE PREFERRED EMBODIMENTS

This embodiment will be described in detail with reference to the illustrative embodiments.

Figure 1:
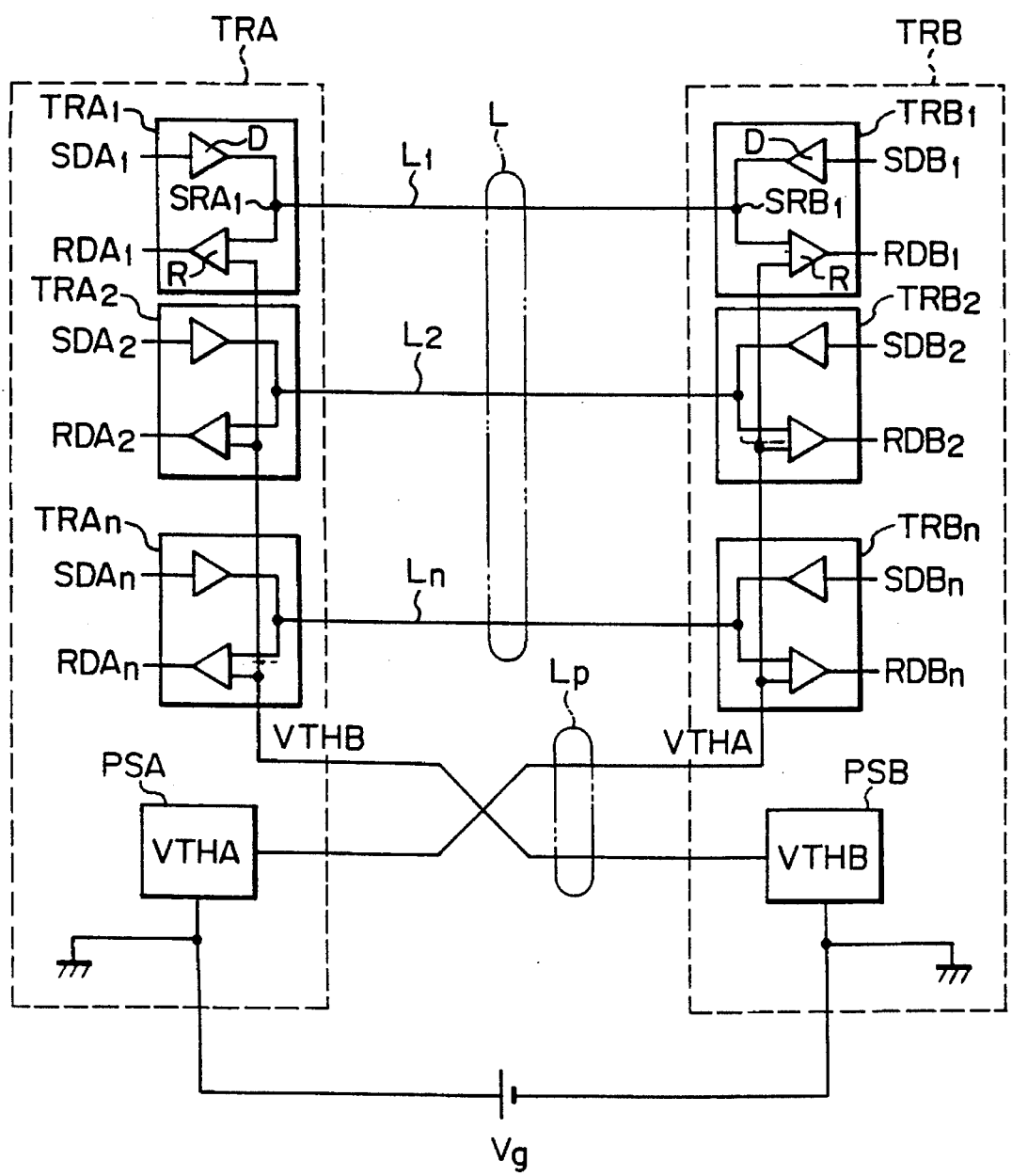
FIG. 1 is a block diagram showing a first embodiment of the present invention.

FIG. 1 is a block diagram showing a first embodiment of the present invention, and this embodiment is used to transmit n-bit signals between opposing transmitter-receiver devices TRA and TRB across the transmission line L.

In FIG. 1, the transmission line L comprises n transmission wires L1 to Ln, and transmitter-receiver circuits TRA1 to TRAn and TRB1 to TRBn are placed against each other and connected to opposite ends of the transmission wires L1 to Ln, each of the transmitter-receiver circuits TRA1 to TRAn and TRB1 to TRBn being formed by a driver (transmitter circuit) D and a receiver (receiver circuit) R.

Each receiver R is formed by a differential amplifier, and the threshold voltages VTHA and VTHB used to decide the logical level of receiving signals are supplied through a power supply line Lp from power units PSA and PSB, which supply electric power to the transmitter-receiver devices TRA and TRB located at the opposite ends.

It ought to be noted that there is a potential difference Vg between the power units PSA and PSB.

In FIG. 1, SDA1 to SDAn and SDB1 to SDBn denote transmitting signals, while RDA1 to RDAn and RDB1 to RDBn denote receiving signals.

FIG. 2 is a detailed circuit diagram showing an embodiment of the driver (transmitter circuit) D and the receiver (receiver circuit) R.

The driver D comprises a balanced type differential amplifier which is formed by transistors Q1 and Q2 having the emitters tied together and connected to a current source ICS1, and corrector resistances RC1 and RC2, and also comprises an emitter-follower type transistor Q3 which has its emitter connected to a current source ITT and amplifies output of the transistor Q2 and sends the amplified output through a terminal resistance RTA (RTB) to a transmission line L. A transmitting signal is input to the base of the transistor Q1. A threshold voltage VBB1 generated in the power unit contained in the device is supplied to the base of the transistor Q2.

On the other hand, the receiver R comprises a balanced type differential amplifier which is formed by transistors Q4 and Q5 tied together and connected to a current source ICS2, and collector resistances RC3 and RC4, and a signal at the junction point to the transmission line L is supplied to the base of the transistor Q4, and a signal obtained with the resistances RBB1 and RBB2 serving as the voltage dividers between the output voltage of the transistor Q3 and the threshold voltage VTHB is input to the base of the other transistor Q5.

Note that the resistances RBB1 and RBB2 are set at the same resistance value.

The terminal resistances RTA and RTB and the resistances RBB1 and RBB2 are maintained in the following relation.

$$RTA/RTB = RBB1/RBB2 \quad (1)$$

$$RTB/RTA = RBB2/RBB1$$

The operation of the transmitter-receiver circuit configured as described above will be described with reference to the time chart in FIG. 3. A case where signals are transmitted between the transmitter-receiver circuits TRA1 and TRB1 is used as a representative example for description.

Figure 3A:
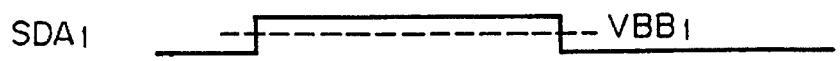
FIG. 3 is a time chart for explaining the operation of the first embodiment in FIG. 1.
Figure 3B:
Figure 3C:
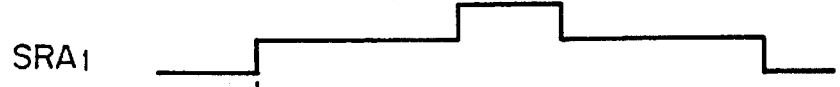

When a transmitting signal SDA1 at HIGH level as shown in FIG. 3(a) is applied to the input of the transmitter-receiver circuit TRA1, the transistor Q1 turns on, the transistor Q2 turns off, and the transistor Q3 turns on, so that a HIGH level transmitting signal SRA1 as shown in FIG. 3(c) is sent through the terminal resistance RTA to the transmission line L1.

Figure 3D:
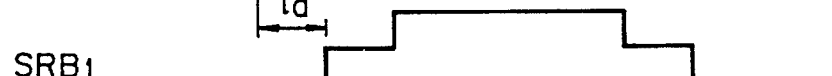

This transmitting signal SRB1, as shown in FIG. 3(d), is delayed by a delay time td of the transmission line L1 and transmitted to the input of the receiver R of the transmitter-receiver circuit TRB1 at the other end.

In the receiver R of the transmitter-receiver circuit TRB1, since the driver D in the same circuit as this receiver R is not sending a signal, a voltage VTHA1 obtained with the resistances RBB1 and RBB2 serving as voltage dividers between the voltage level of the transmitting signal SRA1 and the threshold voltage VTHA is applied to the base of the transistor Q5.

Figure 3E:
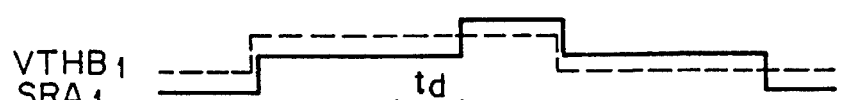
Figure 3F:
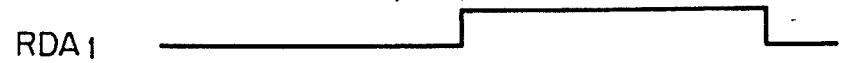
Figure 3G:
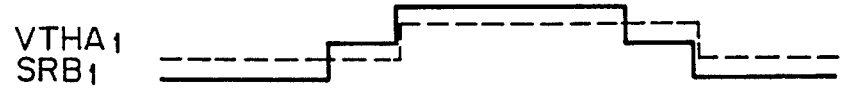
Figure 3H:
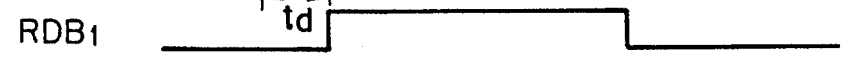

Since the receiver R is formed by a differential amplifier, as shown in FIG. 3(h), if the receiving signal SRB1 from the other end is lower than the threshold voltage VTHA1, a signal RDB1 at LOW level is output, or if the receiving signal SRB1 is higher, the signal RDB1 at HIGH level is output.

Thereafter, when a HIGH level transmitting signal SDB1 as shown in FIG. 3(b) is applied to the input of the transmitter-receiver circuit TRB1, the transistor Q1 turns on, the transistor Q2 turns off, and the transistor Q3 turns on, so that a HIGH level transmitting signal SRB1 as shown in FIG. 3(d) is sent through the terminal resistance RTB to the transmission line L1.

This transmitting signal SRB1, as shown in FIG. 3(e), is delayed by a delay time td of the transmission line L1 and transmitted to the input of the receiver R of the transmitter-receiver circuit TRA1 at the other end.

In the receiver R of the transmitter-receiver circuit TRA1, since the driver D in the same circuit as this receiver R is already sending a HIGH level signal, as shown in FIG. 3(e), a threshold voltage VTHB1 produced by voltage-divider resistances RBB1 and RBB2 between the voltage level of the transmitting signal SRA1 and the thresold voltage VTHB is applied to the base of the transistor Q5.

More specifically, from the time when the transmitting signal SRA1 begins to be sent out, the threshold voltage VTHB1 applied to the base of the transistor Q5 is shifted to the HIGH level side by the amount corresponding to the amplitude of the transmitting signal SRA1. Under this condition, when a HIGH level signal SRA1 is received from the driver D at the other end, the receiver R as shown in FIG. 3(f) outputs a LOW level signal RDA1, if the receiving signal SRA1 is lower than the threshold voltage VTHB1 or the receiver R outputs a HIGH level signal RDA1 if the receiving signal SRA1 is higher than the threshold voltage VTHB1.

On the other hand, in the receiver R of the transmitter-receiver circuit TRB1, from the time when the driver D in the same circuit as this receiver begins to send out a HIGH level signal, the threshold voltage VTHA1 applied to the base of the transistor Q5 is shifted to the HIGH level side by the amount corresponding to the amplitude of the transmitting signal SRB1 of the same device as shown in FIG. 3(g). Under this condition, if the transmitting signal SRA1 from the other device changes to the LOW level, the receiving signal level is lower than the threshold voltage VTHA1, and therefore the signal RDA1 is changed to the LOW level as shown in FIG. 3(h).

As has been described, if the threshold voltages VTHB and VTHA generated by the power units in service in the transmitter-receiver circuits at the opposite ends of the transmission line are used as threshold voltages for logical decision on the receiving signal, even when the level of the receiving signal varies due to the potential difference Vg between the transmitter-receiver devices, the amount of variation is canceled out, so that a logical decision on the receiving signal can be made securely, and therefore the reliability of data transmission can be enhanced.

Figure 4:
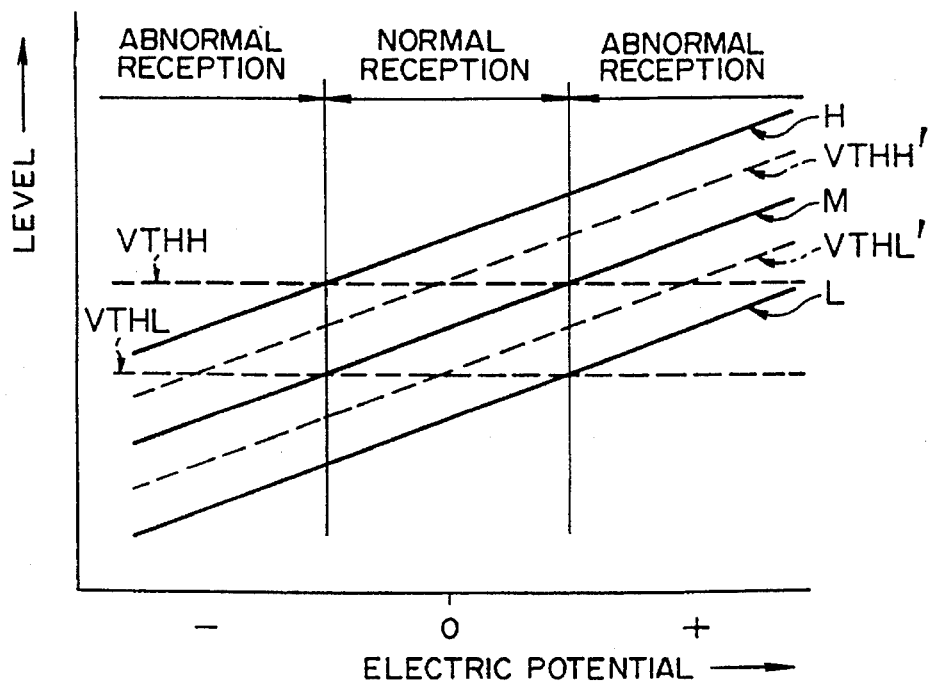
FIG. 4 is a diagram for explaining the effect of a threshold voltage in the embodiment in FIG. 1.

FIG. 4 shows the effects achieved by the method mentioned above. In FIG. 4, the axis of abscissa represents changes in electric potential of the device at the opposite end as viewed from one device, while the axis of ordinates represents changes in the threshold level caused by changes in level of the receiving and transmitting signals.

The letter H denotes a reception level when both the transmitting signal and the receiving signal are at HIGH level. The letter M denotes a reception level when the transmitting signal is at HIGH level and the receiving signal is at LOW level, or the transmitting signal is at LOW level and the receiving signal is at HIGH level. The letter L denotes a reception level when both the transmitting signal and the receiving signals are at LOW level.

The code VTHH is the receiver's level of comparison when the transmitting signal is at HIGH level, VTHL is the receiver's level of comparison when the transmitting signal is at LOW level. The codes VTHH' and VTHL' show changes in the receiver's comparison level when the threshold voltages are supplied from the device at the other end. The codes VTHH and VTHL indicate reception levels when the threshold voltages are self-supplied within the device.

It will be understood from FIG. 4 that when the receiver's comparison levels are obtained from the threshold voltage available in its own device, fixed threshold voltages are maintained regardless of changes in electric potential of the other device, with the result that the levels of threshold voltage do not follow the changes in reception level. For this reason, as shown in FIG. 4, the lines of reception level cross the lines of comparison level, thus exceeding the normal range of data reception.

On the other hand, when the threshold voltage for one device is supplied from the other device, the receiver's comparison levels VTHH' and VTHL' change with the changes in the potential of the other device, and as a result, the relation between the reception level and the comparison levels is maintained normally for a wide range.

This relation can be maintained if it is set as a circuit constant shown in Eq. (1).

Figure 5:
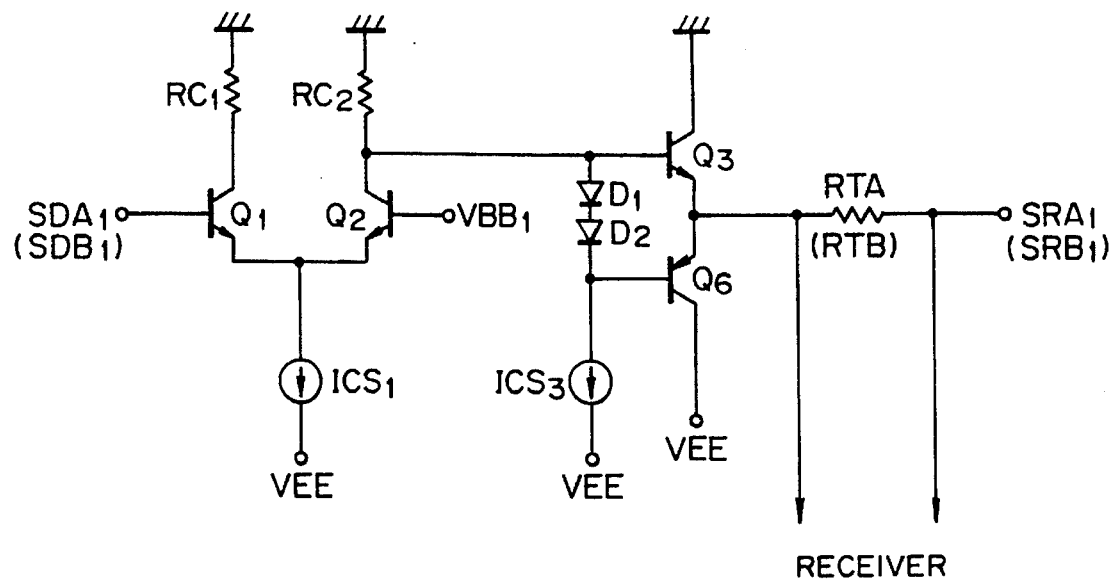
FIG. 5 is a detailed configuration diagram showing a second embodiment of the transmission-reception circuit in FIG. 1.

FIG. 5 is a circuit diagram showing a second embodiment of the driver D, characterized by a complementary circuit configuration at the output stage.

For example, in the driver D in the embodiment in FIG. 2, since the current source ITT always supplies a bias current, electric power is consumed at all times.

In this embodiment, the output stage is formed by adding a transistor Q6 in complementary connection with the transistor Q3. The transistor Q3 is turned on to output a HIGH level signal, and the transistor Q6 is turned on to output a LOW level signal. This embodiment is arranged to let only an amount of current corresponding to output flow to the transmission line.

Note that a bias voltage is applied to the base of the transistor Q6 by output of the junction point between the current source ICS3, and diodes D1 and D2 connected in forward direction to the collector of the transistor Q2.

This arrangement offers a special effect that power consumption can be reduced because only an amount of current corresponding to output is conducted to the transmission line by turning on the transistor Q6.

Figure 6:
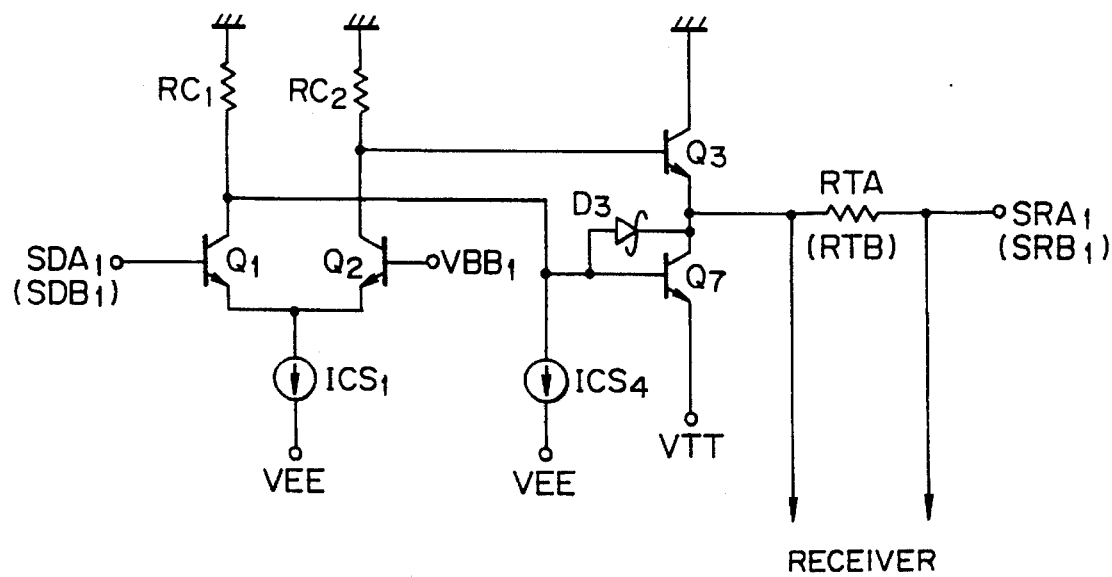
FIG. 6 is a detailed configuration diagram showing a third embodiment of the transmission-reception circuit in FIG. 1.

FIG. 6 is a circuit showing a third embodiment of the driver D, characterized by the output stage formed by a complementary circuit including two NPN transistors. In FIG. 6, a diode D3 is connected between the collector of the transistor Q1 and the collector of a transistor Q7, and output at the junction point between the anode of the diode D3 and a current source ICS4 is input to the base of the transistor Q7. The transistor Q3 is turned on to output a HIGH level signal, and the transistor Q7 is turned on to output a LOW level signal, thereby letting only an amount of current corresponding to output flow to the transmission line L.

By this embodiment, too, it is possible to decrease power consumption like in the embodiment in FIG. 5.

If a transmitter-receiver circuit configured as shown in FIG. 5 or 6 is used, when the transmitter-receiver circuits placed against each other across the transmission line are sending signals of mutually different levels, such as in a combination of high-level (H) and low-level (L) or low-level (L) and high-level (H), a current flows through the transmission line L, so that electric power is consumed. If this power consumption occurs while no data is transmitted, this is quite a waste and needs to be eliminated.

As a solution, during non-communication time, the transmitter-receiver circuits placed against each other are set such that the output voltages of those circuits are at the same level, namely, both at high (H) level or low (L) level. By this arrangement, power consumption during non-communication time is eliminated, so that power consumption can be further reduced.

Description will next be made of a current-driven type transmitter-receiver circuit used with a transmission line of the bus structure.

Figure 7:
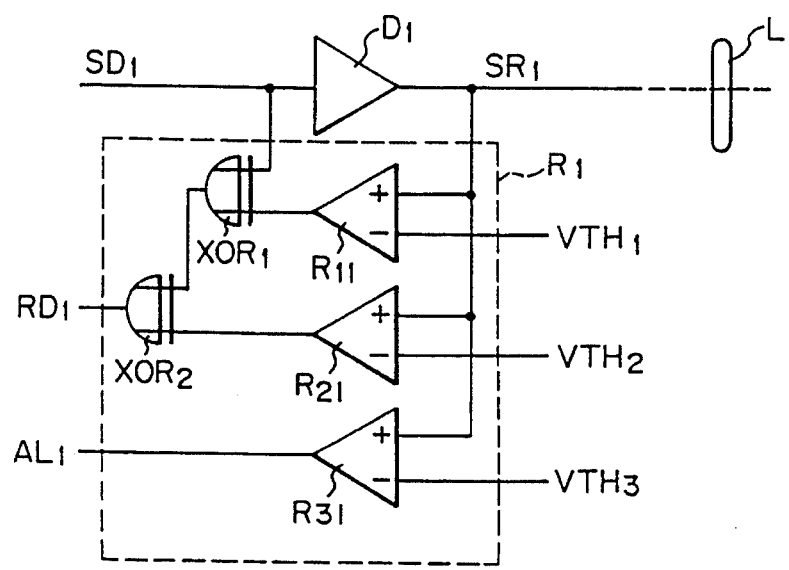
FIG. 7 is a circuit diagram showing a first embodiment of the transmitter-receiver circuit used with a transmission line of the bus structure.
Figure 7:
Figure 7:
Figure 7:

FIG. 7 is a circuit diagram showing a first embodiment of a current-driven type transmitter-receiver circuit formed by a driver Dn (n=1, 2, . . . , n) and a receiver Rn.

The driver Dn is of the same structure as before, but the receiver Rn is characterized by the provision of a function to detect a collision with transmitting signals from other transmitter-receiver circuits. To be more specific, in the transmission line of the bus structure, it is not allowed for the two transmitter-receiver circuits to send signals simultaneously. As a preventive measure, this function is provided which detects a collision of two transmitting signals in the transmission line of the bus structure.

A receiver R1 of this embodiment, as shown in FIG. 8(d), includes first and second receivers R11 and R12 for comparing a signal SR1 sent out on the transmission line L with first and second threshold voltages VTH1 and VTH2 differing in voltage level by the amount corresponding to the amplitude of a signal sent out on the transmission line L, a third receiver R31 for comparing a signal SR1 sent out on the transmission line L with a third threshold voltage VTH3 of a level further higher by the amount corresponding to the amplitude of the signal than the level of the sum of the first and second threshold voltages VTH1 and VTH2, and outputting an alarm signal AL1 to invalidate the signal on the transmission line L when a signal SR1 higher than the third threshold voltage VTH3 appears on the transmission line, and EXCLUSIVE-OR circuits XOR1 and XOR2 for outputting a receiving signal RD1 sent through the transmission line L from another circuit by removing a signal sent from the driver D1 in the same circuit as the receiver R1 on the basis of output signals of the first and second receivers R11 and R21.

The output signal of the receiver R11 and a transmitting signal SD1 to transmit from the driver D are input to the EXCLUSIVE-OR circuit XOR1, while the output signal of the EXCLUSIVE-OR circuit XOR1 and the output signal of the receiver R21 are input to the EXCLUSIVE-OR circuit XOR2.

Figure 8E:
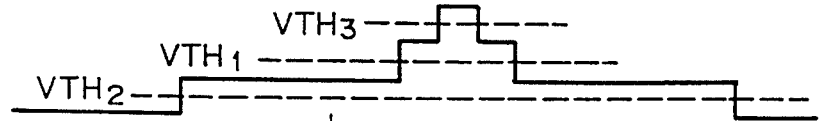
FIG. 8 is a time chart for explaining the operation of the embodiment in FIG. 7.

In this arrangement, when no signal is sent out from the driver D1 and the driver D2 of another transmitter-receiver circuit, the transmission line L is at LOW level, and therefore the output signals of the receivers R11 and R12 are at "0" (LOW) level as shown in FIG. 8(e).

Under this condition, when a HIGH level transmitting signal SD1 as shown in FIG. 8(a) is input to the driver D1, the driver D amplifies and transmits the signal to the transmission line L. Therefore, a signal SR1 as shown in FIG. 8(d) appears on the transmission line L.

When this signal SR1 exceeds the threshold voltage VTH2, the output signal of the receiver R21 goes to the HIGH level. This signal is input to the EXCLUSIVE-OR circuit XOR2, but since the other input of the circuit XOR2 is at the HIGH level, the output remains at the LOW level. The threshold voltage is a voltage level used for making a decision of "HIG"H" or "LOW" in logical circuits by TTL and MOS transistors. In this case, the threshold voltage VTH2 is set at an intermediate level between "HIG"H" and "LOW" of the signal SR1 when a driver sends out a signal onto the transmission line L.

Under this condition, if the driver D2 of another transmitter-receiver circuit begins to send a transmitting signal SD2 as shown in FIG. 8(b), two signals are added, so that the voltage level of the transmission line L becomes about twice higher than before as shown in FIG. 8(d). As the voltage level of the transmission line L exceeds the threshold voltage VTH1, the output signal of the receiver R11 goes to the HIGH level.

This signal is input to the EXCLUSIVE-OR circuit XOR1. This means that both inputs of the circuit XOR1 are at "1" level, causing the output signal to go to "0" level. When output signal of the circuit XOR1 is "0", the output signal of the circuit XOR2 at the next stage goes to the "1" level.

In other words, the signal sent from the driver D2 of another transmitter-receiver circuit is extracted as the receiving signal RD1.

Figure 8E:
Figure 8E:

The signal sent from the driver D2 of another transmitter-receiver circuit is received delayed by a delay time td due to the delay characteristic of the transmission line L as shown in FIG. 8.

Subsequently, under this condition, when a third transmitter-receiver circuit begins to send a transmitting signal SDn as shown in FIG. 8(c), the voltage level of the transmission line L exceeds the threshold voltage VTH3, and therefore the output signal AL1 of the receiver R31 goes to the HIGH level as shown in FIG. 8(g).

The signal AL1 is supplied to a circuit to accept the receiving signal as an alarm signal AL1 which invalidates the signal on the transmission line L.

However, when sending of the transmitting signal SDn is stopped, the voltage level of the transmission line L drops lower than the threshold voltage VTH3, and therefore outputting of the alarm signal AL1 is also stopped.

As described above, by adding the function to detect a collision of signals on the transmission line L, incorrect information is prevented from being transmitted.

By making such an arrangement that the threshold voltages VTH1, VTH2 and VTH3 are supplied from the power units for the transmitter circuits and the receiver circuits at the other end of the transmission line or the threshold voltages are produced from signals supplied, an alarm signal can be sent with higher accuracy.

Figure 9:
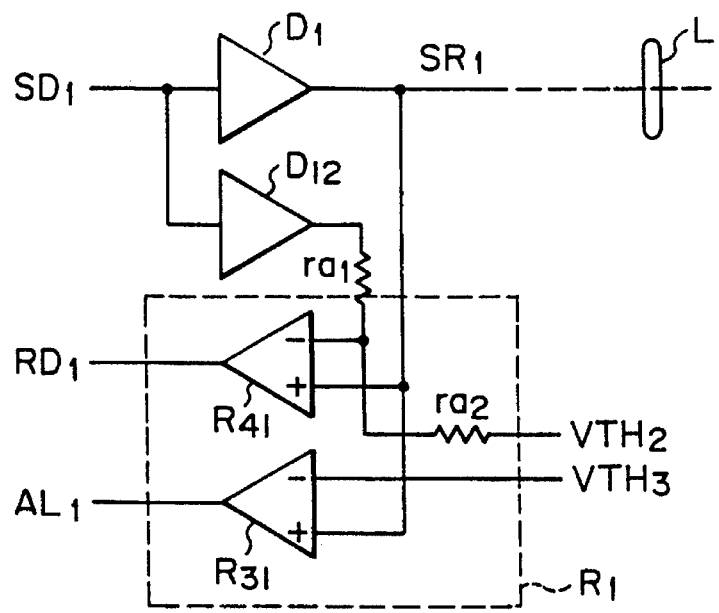
FIG. 9 is a circuit diagram showing a second embodiment of the transmitter-receiver circuit used with the transmission line of the bus structure.

FIG. 9 is a circuit diagram showing a second embodiment of the current-driven type transmitter-receiver circuit, and a difference of this circuit from the circuit in FIG. 7 is that the receiving signal is reproduced by analog level comparison using a single threshold voltage VTH2.

To be more specific, a voltage amplifier D12 to amplify the transmitting signal SD1 to a voltage signal twice as high as the amplitude when the signal is sent onto the transmission line L, and output of the voltage amplifier D12 is applied through a resistance ra1 to a receiver R41 formed of a comparator, a threshold voltage VTH2 (at the same voltage level as in FIG. 8) is applied through a resistance ra2 to the output side of a resistance ra1, and a voltage obtained with the resistances ra1 and ra2 serving as voltage-dividers between the threshold voltage VTH2 and the output voltage of the voltage amplifier D12 is used as a comparative reference voltage of the receiver R41.

Therefore, while the driver D1 in the same circuit is not sending a signal SR1, the comparative reference voltage of the receiver R41 is formed only by the threshold voltage VTH2, and depending on whether or not a signal higher than the threshold voltage VTH2 arrives, the receiving signal from another transmitter-receiver circuit is regenerated.

However, while the driver D1 in the same circuit is sending a signal SR1, as for the comparative reference voltage of the receiver R41, since the threshold voltage VTH2 is shifted to the HIGH level side by the output voltage of the voltage amplifier D12, the comparative reference voltage rises to the level same as the threshold voltage VTH1 shown in FIG. 8. Therefore, it is possible to distinguish a signal sent out from the device at this end and a signal received from the device at the other end of the transmission line, and regenerate only the transmitting signal from the other end.

In this case, a collision of two or more transmitting signals can be detected in the same manner as in FIG. 7.

Figure 10:
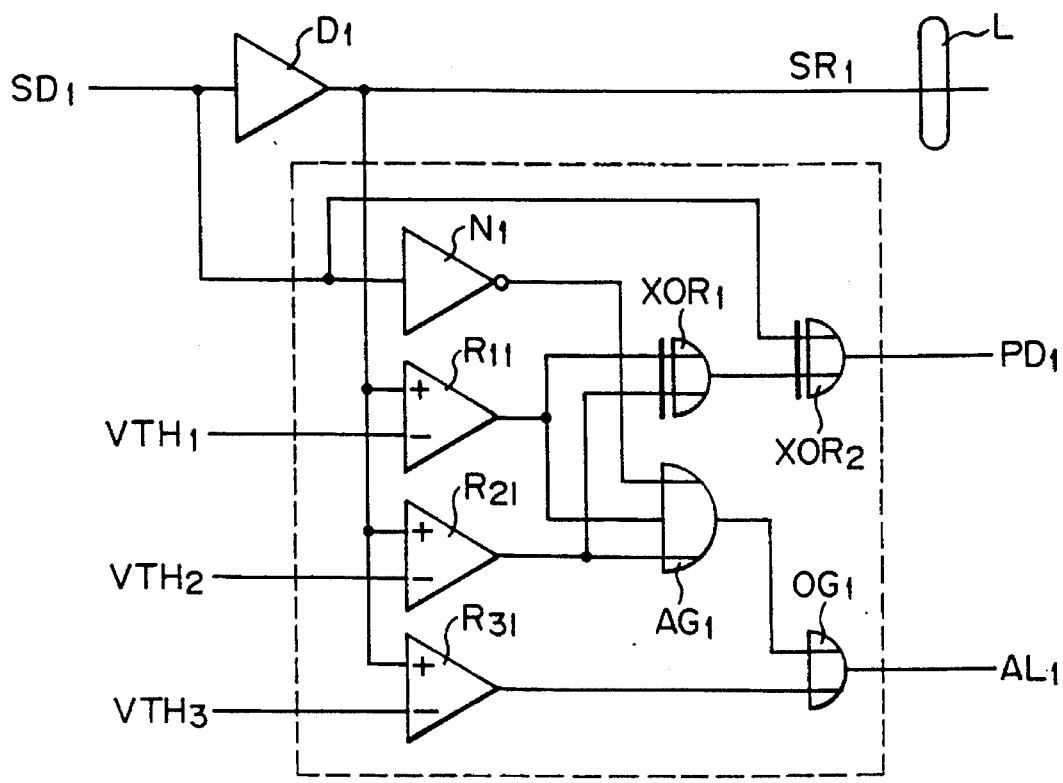
FIG. 10 is a circuit diagram showing a third embodiment of the transmitter-receiver circuit used with the transmission line of the bus structure.

FIG. 10 is a circuit diagram showing a third embodiment of the current-driven type transmitter-receiver circuit, and a difference of this circuit from the circuit in FIG. 7 is that under the condition that another transmitter-receiver circuit is already sending a signal and the voltage level of the transmission line is higher than the threshold voltage VTH1, even when the driver D1 of the device at this end of the transmission line is not sending a signal, an alarm signal AL1 is output.

To this end, the third embodiment of the transmit-receive circuit of the present invention comprises with an inverter N1 for inverting the input condition of a transmitting signal SD1, an AND gate for carrying out the logical AND of an output signal of the inverter N1 and output signals of the receivers R11 and R21, and an OR gate OG1 for outputting as an alarm signal AL1 a signal representing the result of ORing of an output signal of the AND gate AG1 and an output signal of the receiver R31.

In the circuit configuration described above, under the condition that another transmitter-receiver circuit end is already sending a signal and the voltage level of the transmission line L is higher than the threshold voltage VTH1, the output signals of the receivers R11 and R21 are both "1". At this time, if the driver D1 in the same circuit is not sending a signal, the output signal of the inverter N1 is "1", and the AND gate AG1 ANDs its inputs and sends out an output signal of "1". This signal is input to an OR gate OG1 which outputs an alarm signal AL1.

According to this embodiment, it is possible to prevent three transmitting signals from occurring simultaneously. In other words, this embodiment offers a unique effect that different items of information on the transmission line can be avoided securely.

Figure 11:
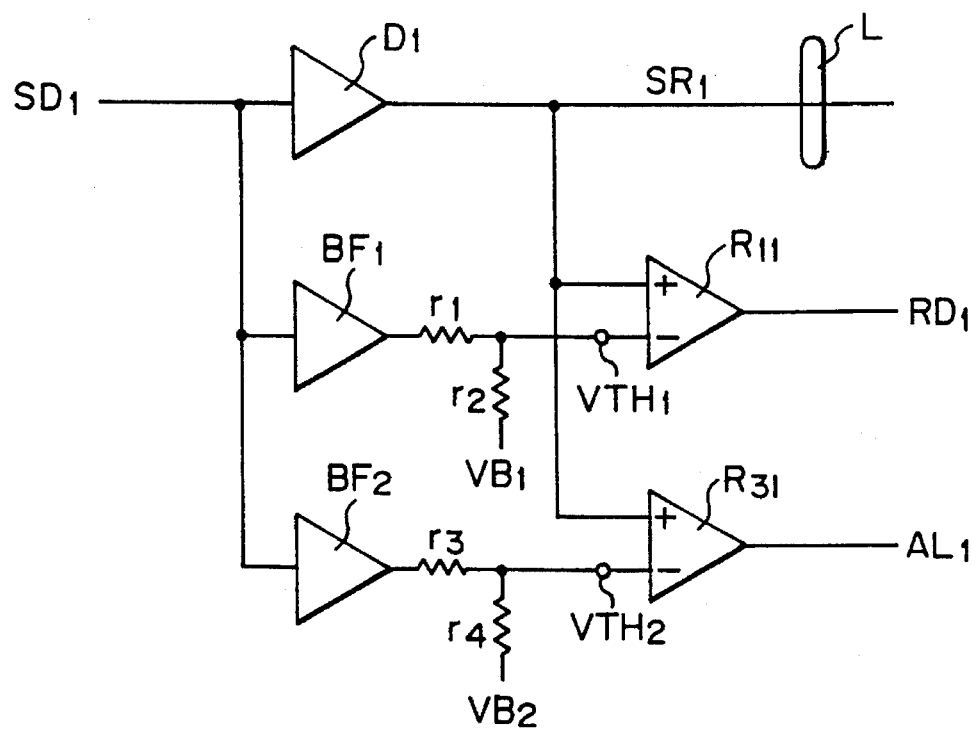
FIG. 11 is a circuit diagram showing a fourth embodiment of the transmit-receive circuit used with the transmission line of the bus structure.

FIG. 11 is a circuit diagram showing a fourth embodiment of the current-driven type transmitter-receiver circuit, a difference of this circuit from the circuit in FIG. 10 is that the regeneration of a receiving signal and the avoidance of signal collision are performed by analog level comparison.

Figure 12:
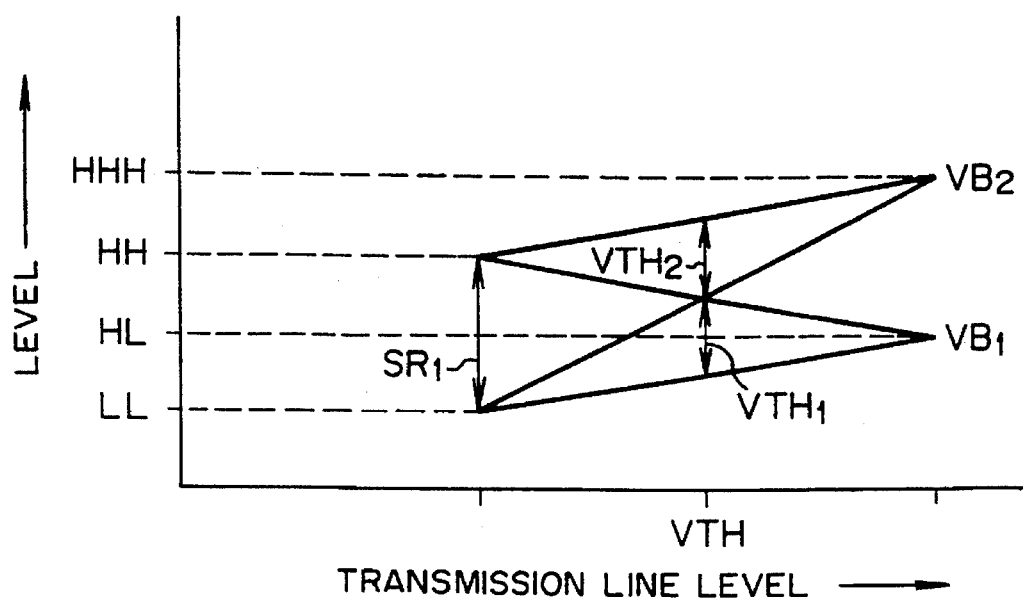
FIG. 12 is a voltage level diagram for explaining the operation of the embodiment in FIG. 11.
Figure 13:
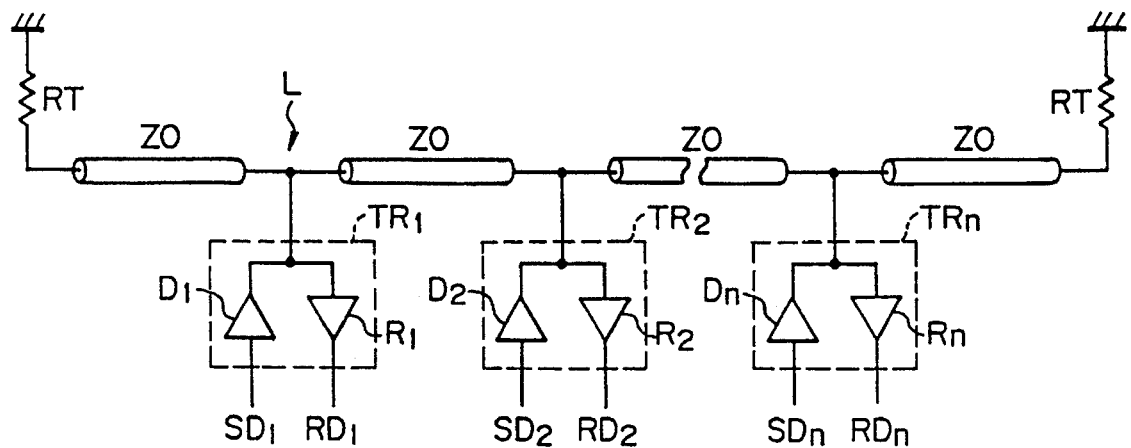
FIG. 13 is a schematic configuration diagram showing the configuration of the conventional transmission-reception circuit used with the transmission line of the bus structure.
Figure 14:
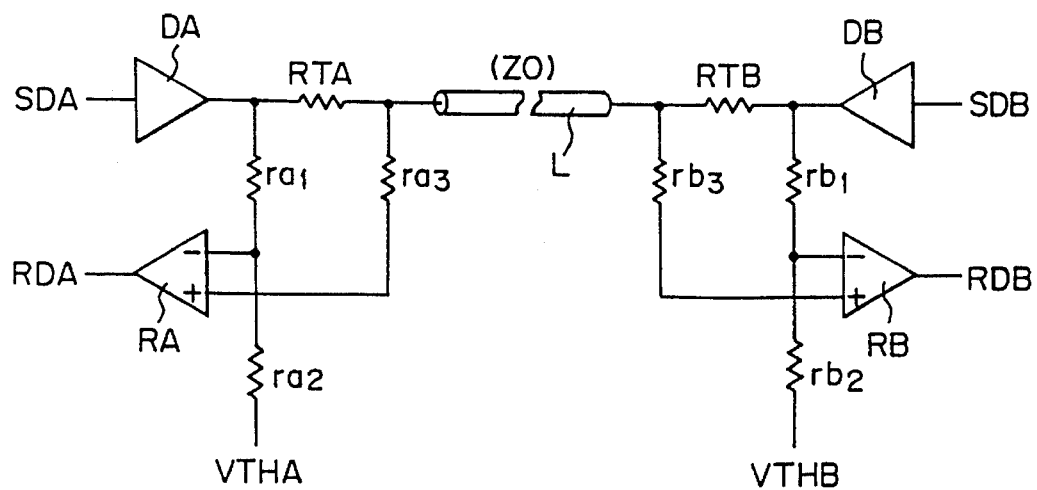
FIG. 14 is a schematic configuration diagram showing the configuration of the conventional transmission-reception circuit using a transmission line at each end of which opposing transmitter-receiver circuits are connected.

To be more specific, buffer amplifiers BF1 and BF2 for a transmitting signal SD1 are provided, output signals of those buffer amplifiers BF1 and BF2 are applied through resistances r1 and r3 to the comparative reference voltage input terminals (−) of receivers R11 and R31, and bias voltages VB1 and VB2 set to satisfy the relation shown in FIG. 12 are applied through resistances r2 and r4 to the comparative reference voltage input terminals (−) of the receivers R11 and R31.

Note that all the resistances r1, r2, r3 and r4 have the same resistance value.

The bias voltage VB1, as indicated by "HL" in FIG. 12, is set at the same level as the amplitude level of a transmitting signal. The bias voltage VB2, as indicated by "HH"H" in FIG. 12, is set at the same amplitude level as the sum of the three transmitting signals.

Therefore, the threshold voltage VTH1 input to the comparative reference input terminal (−) of the receiver R11 moves in a range of 0.5 to 1.5 times of the amplitude level of a transmitting signal according to the output level of the buffer amplifier BF1 as shown in FIG. 12.

Likewise, the threshold voltage VTH2 input to the comparative reference voltage input terminal (−) of the receiver R31 moves in a range two to three times the amplitude level of a transmitting signal according to the output level of the buffer amplifier BF2 as shown in FIG. 12.

In this circuit configuration, when only the driver D1 in the same circuit at this end of the transmission line is sending a signal, the HIGH level output of the buffer amplifier BF2 is added through the resistance r1 to the comparative reference voltage input terminal (−) of the receiver R11, so that the threshold voltage VTH1 rises to a value 1.5 times the amplitude level of a transmitting signal.

Therefore, when only the driver D1 in the same circuit is sending a signal, the output signal RD1 of the receiver R11 is maintained at the LOW level. However, when a transmitting signal from another driver Dn is added, the voltage level of the transmission line L rises twice as high as before, thus exceeding the threshold voltage VTH1. Therefore, the output signal RD1 of the receiver R11 goes to the HIGH level. In other words, it is possible to extract a transmitting signal exclusive of a transmitting signal sent out by this transmitter-receiver circuit from among a composite signal including transmitting signals from this and other transmitter-receiver circuits.

On the other hand, under the condition that the driver D1 in the same circuit is sending a transmitting signal, the threshold voltage VTH2 input to the comparative reference voltage input terminal (−) of the receiver R31 rises to 2.5 times as high as the amplitude level of a transmitting signal.

Therefore, the output signal of the receiver R31 is maintained at the LOW level.

However, under the condition that two signals are sent out on the transmission line L, when a third transmitting signal is sent out, the voltage level of the transmission line L rises to three times higher, thus exceeding the threshold voltage VTH2. For this reason, the output signal AL1 of the receiver R31 changes to the HIGH level. In other words, an alarm signal AL1 is output.

As has been described, according to the present invention, there is provided a transmission-reception circuit, including a transmitter circuit and a receiver circuit connected to each end of a transmission line, for transmitting and receiving a signal to the receiver circuit and from the transmitter circuit at the other end of the transmission line, wherein power supply lines are laid at both the opposite ends of the transmission line, and a threshold voltage for logical decision on a signal received at the receiver circuit is supplied from a power unit used for the transmitter circuit and the receiver circuit at the other end.

Therefore, even if the distance between the transmitting and receiving ends is prolonged and the level of the transmitting signal varies, since the threshold voltage varies likewise, the amount of variation of the signal level is canceled out. As a result, a logical decision on the receiving signal can be made accurately, and a high reliability can be secured for a fully duplex simultaneous two-way communication.

Therefore, if this invention is applied to communication between LSIs which have increased in the number of wires used, the number of wires between LSIs can be reduced for communication with high reliability.

In a transmission-reception circuit, including a transmitter circuit and a receiver circuit connected to a bus-structure type transmission line, for transmitting and receiving a signal to another receiver circuit and from another transmitter circuit through a common transmission line, the receiver circuit comprises a first comparing means for comparing a signal sent out on the transmission line with first and second threshold voltages for logical decision on a signal, these threshold voltages differing in voltage level by the amount corresponding to the amplitude of a signal sent out on the transmission line, and a second comparing means for comparing a signal sent out on the transmission line with a third threshold voltage of a level further higher by the amount corresponding to the amplitude of the signal sent out on the transmission line than the level of the sum of the first and second threshold voltages, and outputting an alarm signal to invalidate the signal on the transmission line when a signal higher than the third threshold voltage appears on the transmission line.

Hence, when a signal higher than the third threshold voltage appears on the common transmission line, an alarm signal is output which invalidates the signal on the common transmission line. By treating the receiving signal as invalid according to this alarm signal, it is possible to detect faulty transmission which occurs when three transmitter circuits simultaneously send out signals on the bus-structure type transmission line.

If the output stage of the transmitter circuit is formed by a pair of switching elements connected in a complementary connection, power consumption in signal transmission can be cut down, and therefore this method is very economical. Above all, this method is very effective in reducing heat generation, when applied to LSIs.

In this case, by setting the output voltages of a plurality of transmitter circuits at the same level, power consumption can be reduced securely.

Furthermore, no special circuit element need not be used, so that production cost can also be reduced.

What is claimed is:

1. A transmission-reception apparatus, including a first transmission-reception circuit connected to one end of a single transmission line, and a second transmission-reception circuit connected to the other end of the transmission line, for transmitting and receiving a signal over said transmission line between said first transmission-reception circuit and said second transmission-reception circuit, wherein said first transmission-reception circuit includes a first transmitter circuit connected to said transmission line for transmitting a signal to, said second transmission-reception circuit, and a first receiver circuit connected to said transmission line for receiving a signal from said second transmission-reception circuit;

said second transmission-reception circuit includes a second transmitter circuit connected to said transmission line for transmitting the signal to said first transmission-reception circuit, and a second receiver circuit connected to said transmission line for receiving the signal from said first transmission-reception circuit;

a first power unit is disposed in the vicinity of said first transmission: reception circuit to supply electric power required for said first transmission-reception circuit;

a second power unit is disposed in the vicinity of said second transmission-reception circuit to supply electric power required for said second transmission-reception circuit;

a power supply line includes a first power supply wire connected between said first power unit and said second receiver circuit, and a second power supply wire connected between said second power unit and said first receiver circuit;

a threshold voltage for logical decision on a receiving signal of said first receiver circuit is supplied from said second power unit through said power supply line; and a threshold voltage for logical decision on a receiving signal of said second receiver circuit is supplied from said first power unit through said power supply line.

2. A transmission-reception apparatus according to claim 1, wherein an output stage of each of said first and second transmitter circuits is formed by a pair of switching elements connected in a complementary connection.

3. A transmission-reception apparatus according to claim 1, wherein voltage levels of respective transmission signals of said first transmitter circuit and said second transmitter circuit are equal to each other during a period of time in which no communication is performed between said first transmission-reception circuit and said second transmission-reception circuit.

4. A transmission-reception apparatus, including at least two transmission-reception circuits connected to a bus-structure type common transmission line, for transmitting and receiving a signal through said common transmission line between said two transmission-reception circuits, wherein each of said transmission-reception circuits includes a transmitter circuit connected to said common transmission line for transmitting a signal to the other transmission-reception circuit, and a receiver circuit connected to said common transmission line for receiving a signal from the other transmission-reception circuit;

each of said receiver circuits comprises first comparing means for comparing a signal sent out on said common transmission line with first and second threshold voltages for logical decision on a receiving signal, said first and second threshold voltages differing in voltage level by an amount corresponding to an amplitude of the signal transmitted and received between said two transmission-reception circuits, receiving signal outputting means for outputting a signal sent out from the other transmission-reception circuit as a receiving signal by removing a signal which is sent out by the transmission-reception circuit to which said receiver circuit belongs on a basis of a comparison result of said first comparing means and an input signal to said transmitter circuit, and second comparing means for comparing the signal sent out on said common transmission line by the transmission-reception circuit to which said receiver circuit belongs with a third threshold voltage of a level further higher by an amount corresponding to an amplitude of said signal sent out on said common transmission line than a sum of the first and second threshold voltages and for outputting a signal to invalidate a signal when the signal having a voltage level exceeding the third threshold voltage appears on said common transmission line.

5. A transmission-reception apparatus according to claim 4, wherein said first, second and third threshold voltages in said receiver circuit are supplied from a power unit which supplies electric power required for the other transmission-reception circuit.

6. A transmission-reception system, including a first transmission-reception device connected to one end of a single transmission line and a second transmission-reception device connected to the other end of said transmission line, for transmitting and receiving a signal over said transmission line between said first transmission-reception device and said second transmission-reception device, wherein said single transmission line includes n transmission wires, where n is an integer greater than or equal to 1;

said first transmission-reception device includes n first transmission-reception circuits respectively connected to said n transmission wires;

said second transmission-reception device includes n second transmission-reception circuits respectively connected to said n transmission wires;

each of said n first transmission-reception circuits includes a first transmitter circuit connected to corresponding one of said n transmission wires for transmitting a signal to corresponding one of said n second transmission-reception circuits, and a first receiver circuit connected to the corresponding one of said n transmission wires for receiving a signal from the corresponding one of said n second transmission-reception circuits;

each of said n second transmission-reception circuits includes a second transmitter circuit connected to corresponding one of said n transmission wires for transmitting a signal to corresponding one of said n first transmission-reception circuits, and a second receiver circuit connected to the corresponding one of said n transmission wires for receiving a signal from the corresponding one of said n first transmission-reception circuits;

said first transmission-reception device includes a first power unit for supplying electric power required for said n second transmission-reception circuits;

said second transmission-reception device includes a second power unit for supplying electric power required for said n first transmission-reception circuits;

a power supply line is laid between said first transmission-reception device and said second transmission-reception device;

said power supply line includes a first power supply wire for connecting said first power unit to said second receiver circuit of each of said n second transmission-reception circuits, and a second power supply wire for connecting said second power unit to said first receiver circuit of each of said n first transmission-reception circuits;

a threshold voltage for logical decision on a receiving signal of said first receiver circuit of each of said n first transmission-reception circuits is supplied from said second power unit through said power supply line; and a threshold voltage for logical decision on a receiving signal of said second receiver circuit of each of said n second transmission-reception circuits is supplied from said first power unit through said power supply line.

7. A transmission-reception system according to claim 6, wherein a voltage level of a transmitting signal of said transmitter circuit of each of said n first transmission-reception circuits is the same as that of a transmitting signal of said transmitter circuit of corresponding one of said n second transmission-reception circuits when no communication is performed between each of said n first transmission-reception circuits and the corresponding one of said n second transmission-reception circuits.

* * * * *